W. E. RICH.
AUTOMATIC GREASE CUP.
APPLICATION FILED JAN. 20, 1920.
1,357,082.
Patented Oct. 26, 1920.
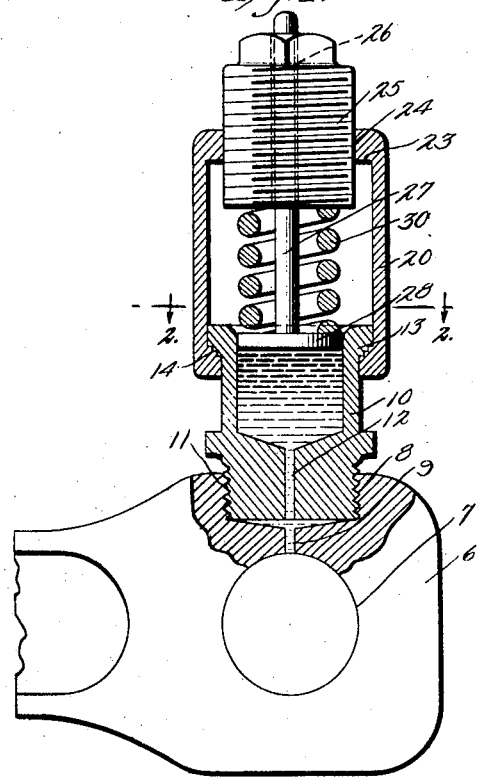
WITNESSES
INVENTOR
WALTER E. RICH.
BY
ATTORNEYS

UNITED STATES PATENT OFFICE.

WALTER EUGENE RICH, OF WHITEHALL, NEW YORK.

AUTOMATIC GREASE-CUP.

1,357,082.　　　　　　　Specification of Letters Patent.　　Patented Oct. 26, 1920.

Application filed January 20, 1920. Serial No. 352,758.

*To all whom it may concern:*

Be it known that I, WALTER E. RICH, a citizen of the United States, and a resident of Whitehall, in the county of Washington and State of New York, have invented a new and Improved Automatic Grease-Cup, of which the following is a full, clear, and exact description.

The present invention relates to new and useful improvements in lubricating devices, and it pertains more particularly to lubricators of the force feed follower type.

It is one of the primary objects of the present invention to construct a device of this character in such a manner that the same may be carried by the moving parts of machinery without affecting the operation of the latter.

It is another object of the present invention to provide a device of this character in which the filling of the grease chamber is greatly facilitated.

It is a further object of the invention to provide a spring for operating the follower and also to provide in combination with said spring, means for adjusting the tension thereof.

It is a still further object of the invention to use the force exerted by the follower spring for maintaining the parts in assembled relation.

With the above and other objects in view, reference is had to the accompanying drawings, in which—

Figure 1 is a view partly in elevation and partly in section of a connecting rod showing the lubricator in place thereon;

Fig. 2 is a transverse sectional view on the line 2—2 of Fig. 1;

Fig. 3 is a detail perspective view of a portion of the lubricator;

Referring more particularly to the drawings, the reference character 6 designates the connecting rod, and 7 designates the bearing to be lubricated. The connecting rod 6 is provided with an internally screw-threaded recess 8, and leading from the bottom of said recess 8 to the bearing 7, is a lubricant passage 9. The reference character 10 designates a lubricant receptacle and said receptacle is provided on its lower end with screw threads 11, which interengage the screw threads of the recess 8 to maintain the receptacle 10 in position on the connecting rod 6. The receptacle 10 is further provided with a lubricant passage 12, which is adapted to be so positioned as to be in a line with the lubricant passage, 9, through the connecting rod 6, as best seen in Fig. 1.

The lubricant receptacle 10 is provided on its upper end with oppositely disposed lugs 13, and each of said lugs is provided with a stepped under wall 14, the purpose of which will be hereinafter described. These lugs 13 have their ends spaced as indicated by the reference character 15. The reference character 20 designates a cylindrical member, and said member is provided on its lower end with internal lugs 21, the upper wall of each of which is stepped as indicated by the reference character 22. The upper end of this member 20 is provided with an annular flange 23, and said annular flange is internally screw-threaded, as at 24, to receive a plug 25. This plug 25 is provided with a centrally-disposed passage 26, and said passage 26 is adapted to receive the stem 27 of a piston 28, said piston operating in the lubricant receptacle 10. Surrounding the stem 27, and engaging the lower face of the plug 25 and the upper face of the piston 28, is a coil spring 30.

The device is assembled in the following manner:

The lubricant receptacle 10 is threaded into the recess 8 in the connecting rod 6, and after said receptacle has been positioned it is filled with lubricant, as indicated in Fig. 1. The piston 28 is then placed in contact with the lubricant in the receptacle 10, and the coil spring 30 is passed over the stem 27. The member 20 is now passed over the stem and the coil spring with its lugs 21 passed through the space 15 between the lugs 13. The member is now turned until the stepped faces of the lugs 21 engage the stepped faces of the lugs 13, after which the plug 25 is inserted and is moved through the screw-threaded opening 24 until it places the coil spring 30 under the desired tension. Under the influence of the tension of the coil spring 30, the piston 28 is caused to force the lubricant through the passage 12 to the bearing 7 to be lubricated, and under the influence of the reaction of the spring, the member is forced outwardly, thus causing the stepped surfaces 22 of its lugs 21 to at all times engage the stepped surfaces 14 of the lugs 13. By means of the screw-threaded plug 25, it will be apparent that the tension of the coil spring 30 may be increased or decreased at the will of the operator.

Claims:

A lubricating device comprising a lubricant receptacle having means for attachment to the bearing to be lubricated, oppositely disposed shoulders formed on the open end of said lubricant receptacle, a cylindrical member adapted for engagement with the shoulders of the lubricant receptacle and having sliding engagement with said lubricant receptacle, a plug adjustably carried by said cylindrical member, a piston operated in the lubricant receptacle and having sliding engagement with said plug, and a spring interposed between said piston and said plug whereby the piston is moved longitudinally of the lubricant receptacle and the cylindrical member is maintained in engagement with the shoulders of the lubricant receptacle, substantially as described.

WALTER EUGENE RICH.